United States Patent [19]

Teshima

[11] Patent Number: 5,723,927
[45] Date of Patent: Mar. 3, 1998

[54] DYNAMIC PRESSURE BEARING SPINDLE MOTOR

[75] Inventor: Hiroyoshi Teshima, Tottori-ken, Japan

[73] Assignee: Matsushita Electric Industrial Co., Ltd., Kadoma, Japan

[21] Appl. No.: 623,254

[22] Filed: Mar. 28, 1996

[30] Foreign Application Priority Data

Mar. 31, 1995 [JP] Japan .................... 7-075654

[51] Int. Cl.$^6$ .................. H02K 5/16; H02K 5/167; H02K 5/173
[52] U.S. Cl. .................. 310/90; 310/90; 310/67 R; 360/99.08; 384/100
[58] Field of Search .................. 310/90, 90.5, 67 R; 384/99, 100, 107, 112, 113, 114; 360/99.01, 99.08, 97.01, 98.07, 99.04

[56] References Cited

U.S. PATENT DOCUMENTS

| 5,112,141 | 5/1992 | Asada et al. | 384/100 |
| 5,210,665 | 5/1993 | Nishizawa | 360/99.08 |
| 5,559,382 | 9/1996 | Oku et al. | 310/90 |
| 5,623,382 | 4/1997 | Moritan et al. | 360/99.08 |

FOREIGN PATENT DOCUMENTS 6233495  8/1994  Japan .

*Primary Examiner*—Thomas M. Dougherty
*Assistant Examiner*—Karl Imayoshi Tamai
*Attorney, Agent, or Firm*—Renner, Otto, Boisselle, Sklar

[57] ABSTRACT

A dynamic pressure bearing spindle motor includes a housing; a sleeve fixed to the housing and having a projecting lip; a rotor hub rotatable with respect to the housing and having a stopper which is engageable with the projecting lip; a shaft fixed to the rotor hub and rotatably inserted into the sleeve; a thrust plate attached to the sleeve so as to be opposed to an end face of the shaft; and lubricating oil provided between the thrust plate and the end face of the shaft to form a thrust bearing and also provided between the shaft and the sleeve to form a radial dynamic pressure bearing. The stopper is put into engagement with the projecting lip of the rotor hub when the rotor hub moves in a thrust direction, thereby preventing the rotor hub from coming off from the sleeve, and wherein dimensions of the motor satisfy the expression $a<2d<b$ where an outer diameter of the sleeve excluding the projection lip is a, an outer diameter of the projecting lip is b, and a radius of curvature of an inner periphery of the stopper is d.

4 Claims, 4 Drawing Sheets

5,723,927

DYNAMIC PRESSURE BEARING SPINDLE MOTOR

BACKGROUND OF THE INVENTION

1. Field of the Invention

The present invention relates to a dynamic pressure bearing spindle motor using a dynamic pressure bearing, which is used in a disk driving apparatus mainly for driving an optical or magnetic disk having a small diameter of about 1.8 inches or about 2.5 inches or less.

2. Description of the Related Art

Recently, optical and magnetic disk apparatuses have been reduced in size, and the capacity of the disks is increased. As notebook-type personal computers have been used more and more widely, spindle motors have been required to be more compact and thinner while improvement in resistance against impact and in precision has been demanded.

Conventional spindle motors mostly use a small ball bearing. In the case when a ball bearing is used in a spindle motor having a small diameter, the following problems occur: (1) a sufficient level of rotation precision cannot be obtained; (2) a sufficiently large capacity of the disk is difficult to be accessed; and (3) the resistance against impact is significantly lowered thus deteriorating the ball bearing, causing noise.

Since it has been confirmed that a sufficiently large capacity of the optical or magnetic disk cannot be accessed with conventional levels of rotation precision realized by a ball bearing, dynamic pressure spindle motors using a fluid dynamic pressure bearing filled with lubricating oil have been developed.

With reference to FIG. 12, a conventional dynamic pressure bearing spindle motor 900 using a dynamic pressure bearing, which is used for a magnetic disk driving apparatus, will be described. FIG. 12 is a cross sectional view of the conventional dynamic pressure bearing spindle motor 900.

As is illustrated in FIG. 12, the spindle motor 900 includes a housing 31, a rotor hub 32, a sleeve 33, a shaft 34, a thrust plate 35, a magnet 36 fixed on the rotor hub 32, stator cores 37, coils 38, and a stopper ring 39.

The housing 31 includes a cylindrical portion 31a and a flange 31b, and an outer part of the flange 31b is attached to a chassis 10 of the disk driving apparatus. On an outer peripheral surface of the cylindrical portion 31a, the stator cores 37 having the coils 38 wound therearound are fixed. The rotor hub 32 has a cup-like shape, and the magnet 36 fixed on an inner peripheral surface thereof includes N poles and S poles which are arranged alternately in a circumferential direction around the rotor hub 32.

The sleeve 33 is fixed on an inner peripheral surface of the cylindrical portion 31a, and the thrust plate 35 is caulked to the sleeve 33. A space defined by the sleeve 33 and the thrust plate 35 is filled with lubricating oil, and the shaft 34 fixed to a core part 32d of the rotor hub 32 is inserted into the space.

An outer peripheral surface of the shaft 34 and the inner peripheral surface of the sleeve 33 form a radial dynamic pressure bearing, and an end face of the shaft 34 and the thrust plate 35 form a thrust dynamic pressure bearing. The shaft 34 rotates with respect to the sleeve 33 via the lubricating oil provided therebetween. Since the shaft 34 is fixed to the core part 32d of the rotor hub 32, the rotor hub 32 also rotates with respect to the sleeve 33. At least one magnetic disk (not shown) clamped to the rotor hub 32 also rotates accordingly.

The stopper ring 39 has a projecting lip 39a, which is projecting into a ring-shaped recess 32b of the rotor hub 32. When the rotor hub 32 moves in a thrust direction A, the rotor hub 32 goes into engagement with the recess 32b to be prohibited from disengaging from the sleeve 33.

The dynamic pressure bearing spindle motor 900 having the above-described structure is assembled in the following manner.

The stator cores 37 having the coils 38 wound therearound are fixed to the housing 31. The sleeve 33 is engaged with the cylindrical portion 31a of the housing 31 and fixed thereto by an adhesive. The thrust plate 35 is caulked to the sleeve 33. The sleeve 33 is positioned so that a disk carrying surface 32a of the rotor hub 32 and the flange 31b of the housing 31 have a predetermined distance therebetween when the assembly is completed.

Next, the shaft 34 is fixed to the rotor hub 32 having the magnet 36 fixed thereon, and the stopper ring 39 is inserted into the recess 32b of the rotor hub 32 and temporarily attached to the rotor hub 32. For inserting the stopper ring 39, the stopper ring 39 is first tilted to insert the projecting lip 39a thereof into the recess 32b, and then is returned to the horizontal orientation.

After the lubricating oil is supplied to the space defined by the sleeve 33 and the thrust plate 35, the shaft 34 fixed to the rotor hub 32 which has the stopper ring 39 is inserted to the space. The stopper ring 39 is attached to the sleeve 33 through a hole 32c formed in the rotor 32. As the sleeve 33 is coated with an adhesive in advance, the stopper ring 39 adheres to the sleeve 33.

However, the conventional dynamic pressure bearing spindle motor 900 has the following problems.

(1) The stopper ring 39, which is temporarily attached to the rotor hub 32 before the shaft 34 is inserted into the sleeve 33, needs to be coaxial with the sleeve 33. Such a coaxial state is achieved only manually, which prevents improvement in workability and ease of assembly.

(2) In the above-described assembly method using adhesives, the next step can be started only after the adhesive is completely cured. Thus, the time required for the assembly cannot be shortened.

SUMMARY OF THE INVENTION

A dynamic pressure bearing spindle motor according to the present invention includes a housing; a sleeve fixed to the housing and having a projecting lip; a rotor hub rotatable with respect to the housing and having a stopper which is engageable with the projecting lip; a shaft fixed to the rotor hub and rotatably inserted into the sleeve; a thrust plate attached to the sleeve so as to be opposed to an end face of the shaft; and lubricating oil provided between the thrust plate and the end face of the shaft to form a thrust bearing and also provided between the shaft and the sleeve to form a redial dynamic pressure bearing. The stopper is put into engagement with the projecting lip of the rotor hub when the rotor hub moves in a thrust direction, thereby preventing the rotor hub from disengaging from the sleeve, and dimensions of the motor satisfy the expression a<2d<b where an outer diameter of the sleeve excluding the projection lip is a, an outer diameter of the projecting lip is b, and a radius of curvature of an inner periphery of the stopper is d.

Alternatively, the dimensions of the motor satisfy the expression a≧b, a>2f, and b>2f where the maximum outer diameter among a plurality of outer diameters of the sleeve is a, an outer diameter of the projecting lip is b, and a radius of curvature of an inner periphery of the stopper is f.

Thus, the invention described herein makes possible an advantage of providing a dynamic pressure bearing spindle motor which can be assembled in a facilitated manner and at lower cost.

These other advantages of the present invention will become apparent to those skilled in the art upon reading and understanding the following detailed description with reference to the accompanying figure.

DESCRIPTION OF THE PREFERRED EMBODIMENTS

Hereinafter, the present invention will be described by way of illustrative examples with reference to the accompanying drawings.

Example 1

Figure 1:
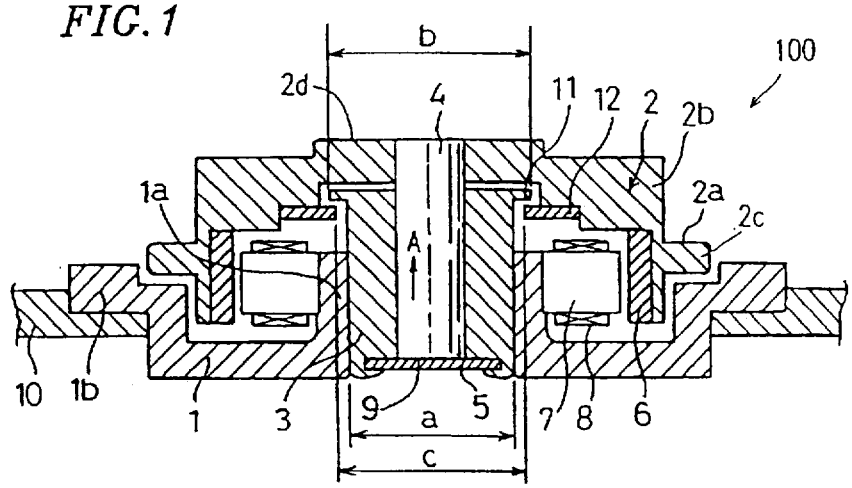
FIG. 1 is a cross sectional view of a dynamic pressure bearing spindle motor in a first example according to the present invention.

With reference to FIG. 1, a dynamic pressure bearing spindle motor 100 in a first example according to the present invention will be described. FIG. 1 is a cross sectional view of the dynamic pressure bearing spindle motor 100 used for a magnetic disk driving apparatus.

As is illustrated in FIG. 1, the spindle motor 100 includes a housing 1, a rotor hub 2, a sleeve 3, a shaft 4, a thrust plate 5, a magnet 6 fixed on the rotor hub 2, stator cores 7, and coils 8. The sleeve 3 has a projecting lip 11 formed along a top outer periphery thereof, and the rotor hub 2 has a ring-shaped stopper 12 fixed thereto.

The housing 1 includes a cylindrical portion 1a and a flange 1b, and an outer part of the flange 1b is attached to a chassis 10 of the disk driving apparatus. The sleeve 3 is attached to an inner peripheral surface of the cylindrical portion 1a. On an outer peripheral surface of the cylindrical portion 1a, the stator cores 7 having the coils 8 wound therearound are fixed. The rotor hub 2 has a cup-like shape, and the magnet 6 fixed on an inner peripheral surface thereof includes N poles and S poles which are arranged alternately in a circumferential direction around the rotor hub 2. The rotor hub 2 has a cylindrical portion 2b for regulating an inner diameter of a magnetic disk and a projecting part 2c having a disk carrying surface 2a. The shaft 4 is fixed to an inner peripheral surface of a core 2d of the rotor hub 2. The rotor hub 2 is rotatable together with the shaft 4 which acts as the center of rotation.

When the coils 8 are electrified, a magnetic field is generated at the plurality of poles, and a torque is generated between the stator cores 7 and the magnet 6 opposed to the stator cores 7. Thus, the rotor hub 2 rotates. In accordance with this, a magnetic disk (not shown) clamped to the rotor hub 2 rotates.

The sleeve 3 is fixed on an inner peripheral surface of the cylindrical portion 1a, and the thrust plate 5 is caulked to a bottom part of the sleeve 3. A space defined by the sleeve 3 and the thrust plate 5 is filled with a fluid such as lubricating oil. The shaft 4 is inserted into the space.

The thrust plate 5 has a spiral dynamic pressure bearing groove 9 formed therein. The shaft 4 is rotatably supported in a thrust direction A by a dynamic pressure which is generated at the interface between the shaft 4 and the thrust plate 5 by the rotation of the shaft 4. In the radial direction also, the shaft 4 is rotatably supported without contacting the sleeve 3 by a dynamic pressure which is generated in the lubricating oil.

When the rotor hub 2 moves in the thrust direction A, the stopper 12 fixed to the rotor hub 2 contacts a bottom surface of the projecting lip 11 of the sleeve 3 to prohibit the rotor hub 2 from disengaging from the sleeve 3.

The dynamic pressure bearing spindle motor 100 having the above-described structure is assembled in the following manner.

The stator cores 7 having the coils 8 wound therearound are fixed to the housing 1 to form a stator assembly. The thrust plate 5 is fixed to the sleeve 3 to form a sleeve bearing assembly. The shaft 4 is fixed to the rotor hub 2 having the magnet 6 fixed thereto to form a rotor assembly.

Then, the lubricating oil is supplied in the sleeve 3 of the sleeve bearing assembly, and the shaft 4 of the rotor assembly is inserted into the sleeve 3 to form a motor sub assembly. The stopper 12 is fixed to the rotor hub 2. The stopper 12 is engageable with the projecting lip 11 of the sleeve 3 when the rotor hub 2 moves in the thrust direction A. Then, the sleeve 3 is inserted into and fixed to the cylindrical portion 1a of the housing 1 of the stator assembly. Thus, the dynamic pressure bearing spindle motor 100 is completed.

The stopper 12 needs to have an inner diameter larger than the outer diameter of the sleeve 3 except for the projecting lip 11, in order to be allowed to be placed around the sleeve 3, but the inner diameter needs to be smaller than the outer diameter of the projecting lip 11. In other words, where the outer diameter of the sleeve 3 is a, the outer diameter of the projecting lip 11 is b, and the inner diameter of the stopper 12 is c, the dimensions satisfy expression (1).

$$a < c < b \tag{1}$$

Example 2

Figure 2:
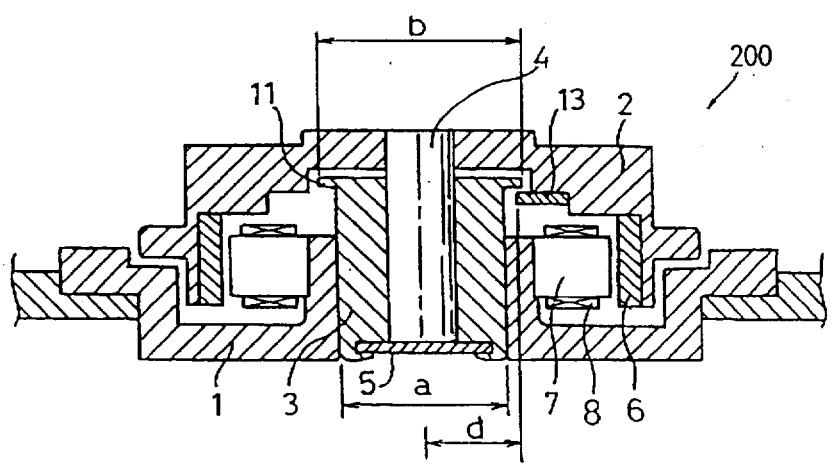
FIG. 2 is a cross sectional view of a dynamic pressure bearing spindle motor in a second example according to the present invention.
Figure 3:
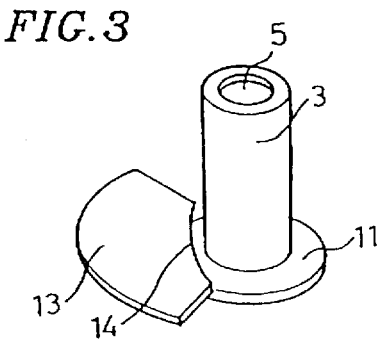
FIG. 3 is a perspective view of a stopper in the dynamic pressure bearing spindle motor shown in FIG. 2 and the vicinity thereof.

With reference to FIGS. 2 and 3, a dynamic pressure bearing spindle motor 200 in a second example according to the present invention will be described. FIG. 2 is a cross sectional view of the dynamic pressure bearing spindle motor 200, and FIG. 3 is a perspective view showing a stopper in the dynamic pressure bearing spindle motor 200 and the vicinity thereof. Identical elements as those in the first example will bear identical reference numerals therewith and the descriptions thereof will be omitted.

As is illustrated in FIGS. 2 and 3, the dynamic pressure bearing spindle motor 200 has basically the same structure as that of the spindle motor 100 in the first example except that a stopper 13 is provided in lieu of the ring-shaped stopper 12. As is illustrated in FIG. 3, the stopper 13 is arc-shaped and has an inner periphery 14 thereof having a larger radius of curvature than the outer diameter a of the sleeve 3. The inner periphery 14 is engageable with the bottom surface of the projecting lip 11 of the sleeve 3.

Where the shortest distance between the rotation axis of the shaft 4 and the inner periphery 14 of the stopper 13 is d in the state where the stopper 13 is incorporated in the spindle motor 200, expression (2) is obtainable in principle, $$2d=c$$
$$a<2d<b \qquad (2)$$

As is appreciated from FIG. 3, the stopper 13 can be inserted through a part of the space between the sleeve 3 and the rotor hub 2 before the sleeve 3 is inserted into the stator assembly instead of being placed around the sleeve 3. The stopper 13 can be provided in various shapes which can be inserted in this manner. The stator assembly is fixed to the motor sub assembly after the stopper 13 is attached thereto. In this manner, the dynamic pressure bearing spindle motor 200 can be assembled in a built-in system.

Example 3

Figure 4:
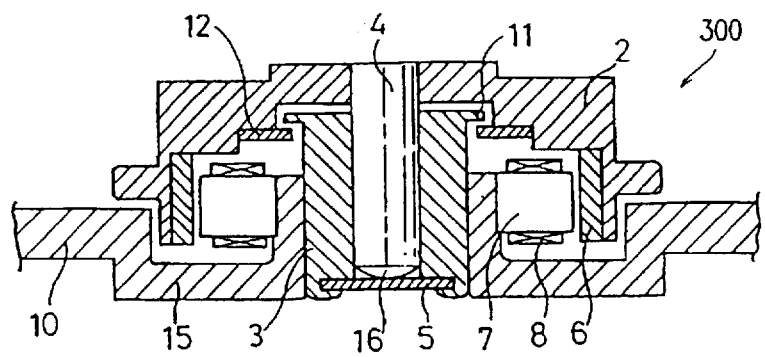
FIG. 4 is a cross sectional view of a dynamic pressure bearing spindle motor in a third example according to the present invention.

With reference to FIG. 4, a dynamic pressure bearing spindle motor 300 in a third example according to the present invention will be described. FIG. 4 is a cross sectional view of the dynamic pressure bearing spindle motor 300. Identical elements as those in the first example will bear identical reference numerals therewith and the descriptions thereof will be omitted.

The spindle motor 300 has basically the same structure as that of the spindle motor 100 in the first example except for the following points.

As is shown in FIG. 4, the spindle motor 300 includes a housing 15 formed integrally with the chassis 10 of the disk driving apparatus and a thrust bearing which includes the thrust plate 5 and a pivot bearing 16. Since the housing 15 is integral with the chassis 10, the stator cores 7 can be fixed to the chassis 10 and, as in the first and the second example, are separated from the motor sub assembly. Accordingly,3( even in the case where the housing 15 is integral with the chassis 10 as in this example, the design of the motor sub assembly is not bound by the shape of the chassis 10. In other words, the motor sub assembly of the same design can be used for various shapes of chassis 10.

Example 4

Figure 5:
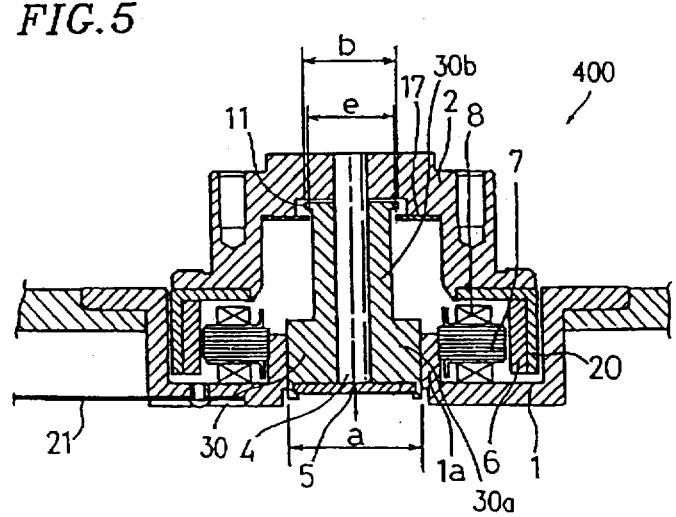
FIG. 5 is a cross sectional view of a dynamic pressure bearing spindle motor in a fourth example according to the present invention.
Figure 6:
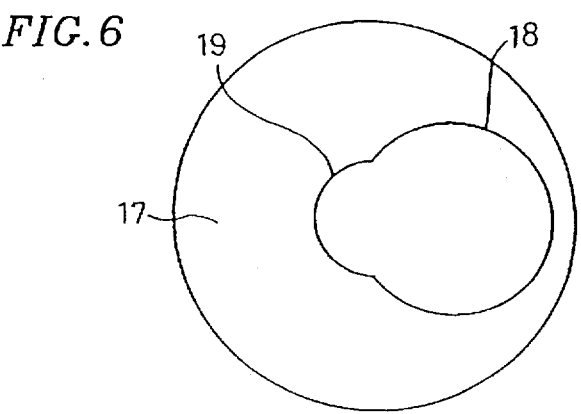
FIG. 6 is a top view of a stopper in the dynamic pressure bearing spindle motor shown in FIG. 5.

With reference to FIGS. 5 and 6, a dynamic pressure bearing spindle motor 400 in a fourth example according to the present invention will be described. FIG. 5 is a cross sectional view of the dynamic pressure bearing spindle motor 400, and FIG. 6 is a top view of a stopper in this example. Identical elements as those in the first example will bear identical reference numerals therewith and the descriptions thereof will be omitted.

As is illustrated in FIG. 6, the dynamic pressure bearing spindle motor 400 has a stopper 17 having a different shape from that of the stopper 12 or 13 in compliance with the sleeve 30 also having a different shape as that in the previous examples. The sleeve 30 has a lower portion 30a engaged with the housing 1, and an upper portion 30b having a diameter smaller than that of the lower portion 30a and having the projecting lip 11 around a top periphery thereof. A rotor frame 20 is fixed to a bottom part of the rotor hub 2. The rotor frame 20 has a cup-like shape, and the magnet 6 is fixed on an inner peripheral surface of an outer cylindrical portion of the rotor fame 20. A printed circuit board 21 is attached to a bottom surface of the housing 1, and leads of the coils 8 are soldered thereto.

As is shown in FIG. 5, the outer diameter a of the lower portion 30a of the sleeve 30 is larger than the outer diameter b of the projecting lip 11. Due to such a shape of the sleave 30, a simply ring-shaped stopper does not function properly. The stopper 17, as is shown in FIG. 6, has a hole, the cross section of which is defined by a profile of two offset overlapping circles 18 and 19. The larger circle 18 is sufficiently large to allow the lower portion 30a of the sleeve 30 to be inserted therethrough, and the smaller circle 19 is sufficiently small to allow the stopper 17 to be engaged with a bottom surface of the projecting lip 11. Where the outer diameter of the lower portion 30a of the sleeve 30 is a, the outer diameter of the projecting lip 11 is b, and the diameter of the smaller circle 19 in the stopper 17 is e, the dimensions satisfy expression (3).

$$a \geq b, \ a>e, \text{ and } b>e \qquad (3)$$

With the stopper 17 having such a hole, the dynamic pressure bearing spindle motor 400 can be assembled in a built-in system even if the outer diameter of the projecting lip 11 is smaller than the outer diameter of the lower portion 30a of the sleeve 30.

Example 5

Figure 7:
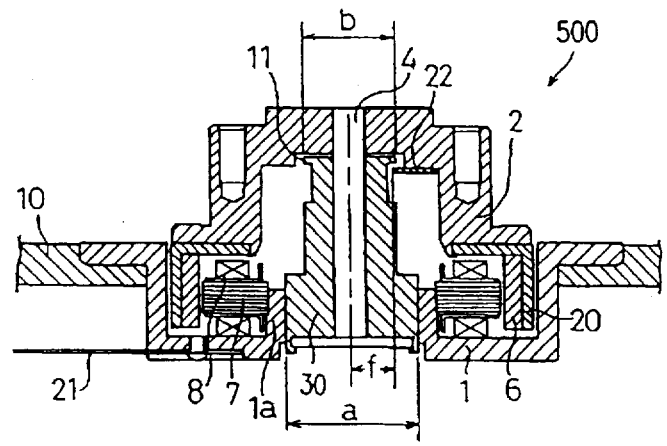
FIG. 7 is a cross sectional view of a dynamic pressure bearing spindle motor in a fifth example according to the present invention.
Figure 8:
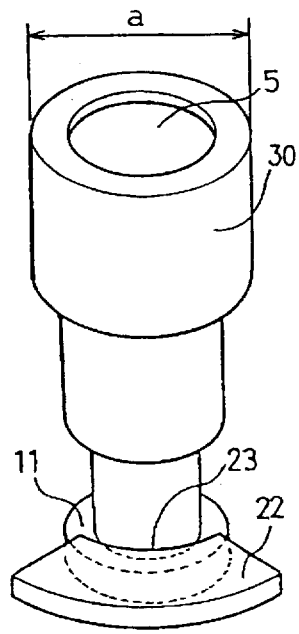
FIG. 8 is a perspective view of a stopper in the dynamic pressure bearing spindle motor shown in FIG. 7 and the vicinity thereof.

With reference to FIG. 7 and 8, a dynamic pressure bearing spindle motor 500 in a fifth example according to the present invention will be described. FIG. 7 is a cross sectional view of the dynamic pressure bearing spindle motor 500, and FIG. 8 is a perspective view showing a stopper in the dynamic pressure bearing spindle motor 500 and the vicinity thereof. Identical elements as those in the fourth example will bear identical reference numerals therewith and the descriptions thereof will be omitted.

As is illustrated in FIGS. 7 and 8, the dynamic pressure bearing spindle motor 500 has basically the same structure as that of the spindle motor 400 except that a stopper 22 is provided in lieu of the stopper 17. The stopper 22 is arc-shaped, and an inner periphery 23 of the stopper 22 is engageable with a bottom surface of the projecting lip 11 of the sleeve 30 when the stopper 22 is attached to the rotor hub 2.

Where the shortest distance between the rotation axis of the shaft 4 and the inner periphery 23 of the stopper 22 is f in the state where the stopper 22 is incorporated in the spindle motor 500, expression (4) is obtainable in principle.

$$2f=c$$
$$a \geq b, \ a>2f, \text{ and } b>2f \qquad (4)$$

As is appreciated from FIG. 8, the stopper 22 can be inserted through a part of the space between the sleeve 30 and the rotor hub 2 before the sleeve 30 is inserted into the stator assembly instead of being placed around the sleeve 30. Accordingly, the stopper 22 can be provided in various shapes which can be inserted in this manner. The stator assembly is fixed to the motor sub assembly after the stopper 22 is attached thereto. In this manner, the dynamic pressure bearing spindle motor 500 can be assembled in a built-in system.

Example 6

Figure 9:
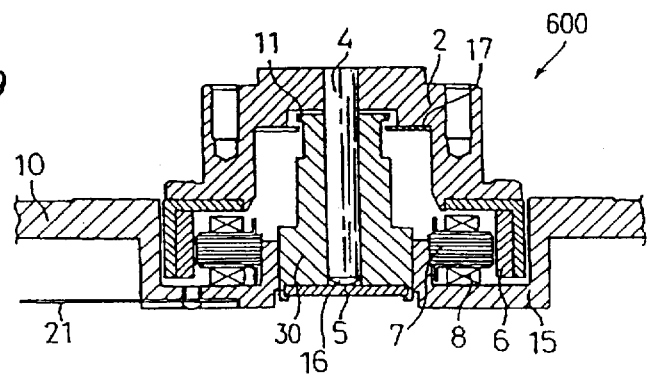
FIG. 9 is a cross sectional view of a dynamic pressure bearing spindle motor in a sixth example according to the present invention.

With reference to FIG. 9, a dynamic pressure bearing spindle motor 600 in a sixth example according to the present invention will be described. FIG. 9 is a cross sectional view of the dynamic pressure bearing spindle motor 600. Identical elements as those in the fourth example will bear identical reference numerals therewith and the descriptions thereof will be omitted.

The spindle motor 600 has basically the same structure as that of the spindle motor 400 in the fourth example except for the following points.

As is shown in FIG. 9, the spindle motor 600 includes a housing 15 formed integrally with the chassis 10 of the disk driving apparatus and a thrust bearing which includes the thrust plate 5 and a pivot bearing 16. Since the housing 15 is integral with the chassis 10, the stator cores 7 can be fixed to the chassis 10 and, as in the fourth and the fifth example, are separated from the motor sub assembly. Accordingly, even in the case where the housing 15 is integral with the chassis 10 as in this example, the design of the motor sub assembly is not bound by the shape of the chassis 10. In other words, the motor sub assembly of the same design can be used for various shapes of chassis 10.

Example 7

Figure 10:
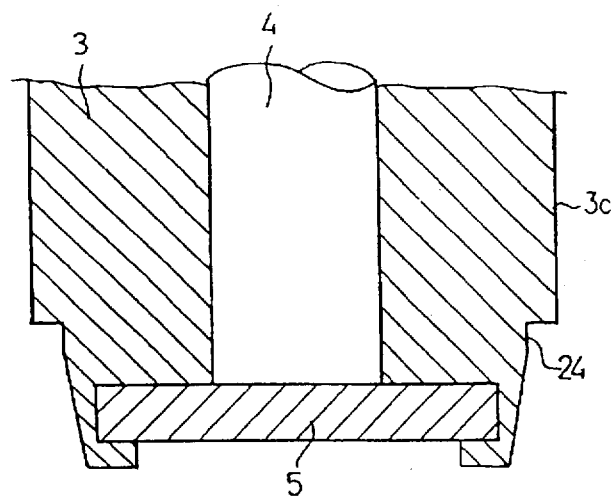
FIG. 10 is a side view of a bottom part of a sleeve in a modification of each of the examples shown in FIGS. 1 through 9.

With reference to FIG. 10, a modification of the dynamic pressure bearing spindle motor in each of the first through sixth examples according to the present invention will be described. FIG. 10 is a side view of a bottom portion of the sleeve 3 or 30 and the vicinity thereof. Identical elements as those in the previous examples will bear identical reference numerals therewith and the descriptions thereof will be omitted.

As is shown in FIG. 10, a bottom part 24 of the sleeve 3 or 30 to which the thrust plate 5 is to be caulked is inwardly tapered toward a bottom and thereof.

When the thrust plate 5 is caulked to the sleeve 3, a part of the sleeve 3 to which the thrust plate 5 is caulked is extended outwardly to have a larger diameter. In this example, such a part 24 is tapered to have a smaller diameter in advance. Thus, even if the bottom part 24 is extended outwardly by caulking, a portion 3c of the sleeve 3 which is engaged with the cylindrical portion 1a of the housing 1 is not influenced by that extension. Accordingly, the portion 3c of the sleeve 3 can be smoothly inserted into the housing 1.

Example 8

Figure 11:
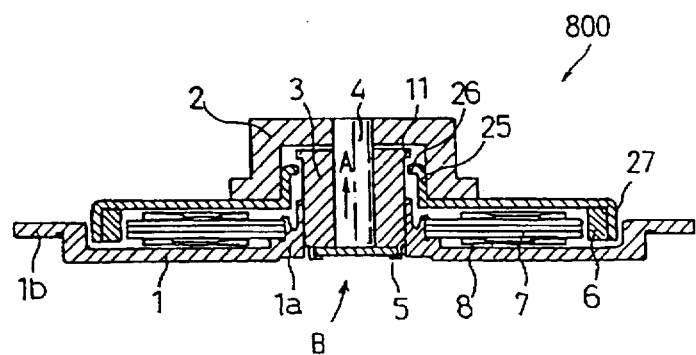
FIG. 11 is a cross sectional view of a dynamic pressure bearing spindle motor in an eighth example according to the present invention.
Figure 12:
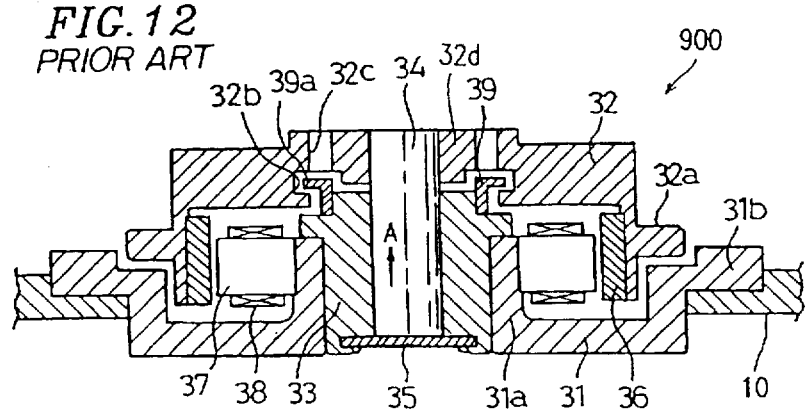
FIG. 12 is a cross sectional view of a conventional dynamic pressure bearing spindle motor.

With reference to FIG. 11, a dynamic pressure bearing spindle motor 800 in an eighth example according to the present invention will be described. FIG. 11 is a cross sectional view of the dynamic pressure bearing spindle motor 800. Identical elements as those in the previous examples will bear identical reference numerals therewith and the descriptions thereof will be omitted.

As is illustrated in FIG. 11, a rotor frame 27 is fixed to a bottom part of the rotor hub 2 as in the fourth example. The rotor frame 27 in the eighth example has an inner cylindrical portion 25 engaged with an inner peripheral surface of the rotor hub 2 and a projecting lip 26 projecting toward an outer peripheral surface of the sleeve 3 from the inner cylindrical portion 25. The projecting lip 26 acts as a stopper engageable with a bottom surface of the projecting lip 11 of the sleeve 3 when the rotor hub 2 moves in the thrust direction A. The inner diameter of the projecting lip 26 is equal to the inner diameter c of the stopper 12 in the first example.

The dynamic pressure bearing spindle motor 800 illustrated in FIG. 11 is assembled in the following manner.

The stator cores 7 having the coils 8 wound therearound are fixed to the housing 1 to form a stator assembly. The thrust plate 5 is fixed to the sleeve 3 to form a sleeve bearing assembly. The magnet 6 is fixed to the rotor frame 27 to form a rotor frame assembly. The shaft 4 is fixed to the rotor hub 2 to form a rotor assembly.

Then, the lubricating oil is supplied in the sleeve 3 of the sleeve bearing assembly, and the shaft 4 of the rotor assembly is inserted into the sleeve 3 to form a rotor-sleeve assembly. The inner cylindrical portion 25 of the rotor frame assembly is inserted into the rotor-sleeve assembly from side B of the thrust plate 5, and the rotor frame assembly is fixed to the rotor-sleeve assembly, to form a motor sub assembly. The projecting lip 26 acting as a stopper is engageable with the bottom surface of the projecting lip 11 when the rotor hub 2 moves in the thrust direction A. Then, the sleeve 3 is inserted into and fixed to the cylindrical portion 1a of the housing 1 of the stator assembly. Thus, the dynamic pressure bearing spindle motor 800 is completed.

In the first through the eighth examples, the stopper may be in contact with or out of contact with the sleeve in the vertical direction with respect to the rotation axis of the shaft 4.

As has been described so far, according to the present invention, the sleeve has a projecting lip and the rotor hub as a stopper, for preventing the rotor hub from being pulled off form the sleeve when the rotor hub moves in the thrust direction. By setting the sizes of the sleeve, the projecting lip of the sleeve and the stopper in a prescribed relationship, the dynamic pressure bearing spindle motor can be assembled in a built-in system. Thus, the assembly is facilitated, and the production cost is also reduced.

Even in the case where a part of the sleeve engaged with the housing has a larger diameter than the diameter of the projecting lip of the sleeve, the same manner of assembly can be realized by forming a hole in the stopper having a radius of curvature which is equal to or greater than the maximum diameter of the sleeve.

The same manner of assembly is still realized even if the stopper is partially engageable with the projecting lip, or even if the housing is integrally formed with the chassis of the disk driving apparatus.

In the case where a part of the sleeve to which the thrust plate is to be caulked is reduced in the diameter, extension of that part caused by caulking does not prevent the sleeve from being smoothly inserted into the housing.

In the case where a rotor frame is attached to the rotor hub, use of a part of the rotor frame as a stopper eliminates the necessity of providing a separate stopper and thus reduces the number of elements and the number of production steps.

In the above-described examples, the present invention is applied to the magnetic disk driving apparatus, but the present invention is also applicable to an optical disk driving apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A dynamic pressure bearing spindle motor, comprising:
   a housing;
   a sleeve fixed to the housing and having a projecting lip;
   a rotor hub rotatable with respect to the housing and having a stopper which is engageable with the projecting lip;
   a shaft fixed to the rotor hub and rotatably inserted into the sleeve;
   a thrust plate attached to the sleeve so as to be opposed to an end face of the shaft; and
   lubricating oil provided between the thrust plate and the end face of the shaft to form a thrust bearing and also provided between the shaft and the sleeve to form a radial dynamic pressure bearing,
   wherein the stopper is put into engagement with the projecting lip of the rotor hub when the rotor hub moves in a thrust direction, thereby preventing the rotor hub from disengaging from the sleeve,
   wherein dimensions of the motor satisfy the expression $a \geq b$, $a > 2f$, and $b > 2f$ where the maximum outer diameter among a plurality of outer diameters of the sleeve is a, an outer diameter of the projecting lip is b, and a radius of curvature of an inner periphery of the stopper is f, and
   wherein the inner periphery of the stopper further has a radius of curvature which is greater than half of the maximum outer diameter of the sleeve.

2. A dynamic pressure bearing spindle motor according to claim 1, wherein the housing is integrally formed with a chassis of a disk driving apparatus in which the dynamic pressure bearing spindle motor is to be included.

3. A dynamic pressure bearing spindle motor according to claim 1, wherein the thrust plate is caulked to a part of the sleeve, and the part of the sleeve has such a pre-caulking outer diameter as to avoid the part from contacting the housing as a result of caulking.

4. A dynamic pressure bearing spindle motor according to claim 1, further comprising a rotor frame which as a magnet fixed thereto and is fixed to the rotor hub, and a part of the rotor frame acts as the stopper.

* * * * *